United States Patent Office 3,557,209
Patented Jan. 19, 1971

3,557,209
PHENOXYACETAMIDES
Sidney B. Richter and Jordan P. Berliner, Chicago, Ill. assignors to Velsicol Chemical Corporation, Chicago, Ill., a corporation of Delaware
No Drawing. Continuation-in-part of applications Ser. No. 437,311, and Ser. No. 437,312, Mar. 4, 1965. This application Oct. 18, 1967, Ser. No. 676,089
Int. Cl. C07c *103/30*
U.S. Cl. 260—559     7 Claims

ABSTRACT OF THE DISCLOSURE

A compound of the formula:

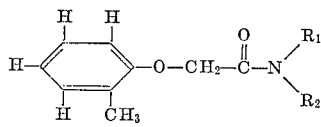

wherein $R_1$ is selected from the group consisting of lower alkyl, lower alkenyl, lower alkynyl, haloalkyl, haloalkenyl, hydroxyalkyl, carboxyalkyl, lower alkoxyalkyl and cyanoalkyl; and $R_2$ is selected from the group consisting of hydrogen, lower alkyl, lower alkenyl, lower alkynyl, haloalkyl, haloalkenyl, hydroxyalkyl, carboxyalkyl, lower alkoxyalkyl and cyanoalkyl.

---

This application is a continuation-in-part of our copending applications Ser. No. 437,311, and Ser. No. 437,312 both filed Mar. 4, 1965, and now abandoned.

This invention relates to new composition of matter having the following structural formula:

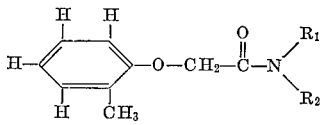

wherein $R_1$ is selected from the group consisting of lower alkyl, lower alkenyl, lower alkynyl, haloalkyl, haloalkenyl, hydroxyalkyl, carboxyalkyl, lower alkoxyalkyl and cyanoalkyl; and $R_2$ is selected from the group consisting of hydrogen, lower alkyl, lower alkenyl, lower alkynyl, haloalkyl, haloalkenyl, hydroxyalkyl, carboxyalkyl, lower alkoxyalkyl and cyanoalkyl.

The novel amides of the present invention can be prepared conveniently from 2-methylphenoxyacetic acid, which is commercially available, or can be synthesized by treating the o-cresol with an alkali metal hydroxide to form the salt, and treating the salt with a haloacetic acid or its ester of the formula

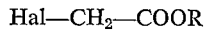

wherein Hal is halogen and R is hydrogen or lower alkyl.

The free acid can then be converted to its acid chloride, which is treated with an amine of the formula

wherein $R_1$ and $R_2$ are as described above, to give the desired compound of the present invention. Exemplary of amines useful as a reactant to prepare amides of the present invention, are: methylamine, N,N-dimethylamine, ethylamine, n-propylamine, N,N-di-n-propylamine, isopropylamine, N,N-diisopropylamine, N-methyl-N-n-propylamine, N-methyl-N-isopropylamine, allylamine, N,N-diallylamine, glycine-N-β-chloroethylamine, aminoacetonitrile, N-β-methoxyethylamine, N-β-methoxyisopropylamine, and the like.

More particularly, the free acid is treated with an equimolecular or greater quantity of thionyl chloride, preferably in a solvent or diluent, such as benzene. An amount of solvent or diluent approximately equal in volume to the volume of the free acid has been found to be satisfactory. The treatment is performed by heating for several hours, preferably at reflux if a solvent or diluent, such as benzene, or large excess of thionyl chloride is used. The corresponding acyl chloride thus formed can be isolated from the reaction mixture by means common to the art, such as by distillation of the solvent or diluent and unreacted reactants, leaving the acyl chloride as the residue.

In the second step, the acyl chloride is reacted with an equimolecular or greater amount of the appropriate amine or its hydrochloride, in the presence of a base, such as sodium hydroxide, potassium hydroxide, or potassium carbonate. At least one equivalent quantity of base, is used when the free amine is utilized as the reactant, and at least twice that amount is used when the amine hydrochloride is used as the reactant. The base is used to release the amine from its hydrochloride, and to neutralize the hydrogen chloride, formed during the reaction. A small amount of water is preferably added to the reaction mixture to form an aqueous solution of the base to aid in mixing the base into the solution of the amine or aminehydrochloride reactant. The reaction is conveniently performed utilizing a solvent or diluent, such as benzene, by heating for several hours preferably at reflux temperature when a solvent or diluent is used. When potassium carbonate is used as the base, completion of the reaction can be readily detected by the cessation of the release of carbon dioxide gas. The amide compound of the present invention formed by the above procedure can be separated from the reaction mixture by means common to the art, such as by filtration from precipitated salts and unreacted amine, drying the filtrate and distilling the filtrate under reduced pressure to remove unreacted reactants and solvent or diluent, if used, and to recover the desired product as the residue. The amide compound of the present invention thus obtained can be used for many applications as such, or can be recrystallized from a suitable solvent.

The manner in which the new compounds of this invention can be prepared is illustrated in the following examples.

EXAMPLE 1

Preparation of 2-methylphenoxyacetyl chloride 2-methylphenoxyacetic acid (161.9 g; 0.975 mol) and toluene (400 ml.) were placed in a 1 liter three-necked round bottom flask fitted with a mechanical stirrer, reflux condenser topped with a calcium chloride drying tube, and a dropping funnel. The contents of the flask were stirred and thionyl chloride (77.9 ml.; 1.074 mol) was slowly added to the flask. The contents were heated to reflux and stirring was continued at reflux for about 7 hours. The reaction mixture was boiled with ground charcoal and filtered while hot. The filtrate was dried over magnesium sulfate, filtered and distilled under reduced pressure to remove benzene and excess thionyl chloride. The residue was distilled in vacuo to yield the product 2-methylphenoxyacetyl chloride as a clear, yellow liquid boiling 120–2° C./16 mm. Hg pressure.

EXAMPLE 2

Preparation of N-methyl-2-methylphenoxyacetamide

Methylamine-hydrochloride (6.6 g. 0.98 mol), potassium carbonate (14.9 g.; 0.108 mol) and benzene (100 ml.) were placed in a 300 ml. three-necked round bottom flask fitted with a mechanical stirrer, reflux condenser and dropping funnel. The mixture was cooled in an ice bath and water (10 ml.) was added thereto. The mixture was stirred and 2-methylphenoxyacetyl chloride (18 g.; 0.098 mol) in benzene (25 ml.) was slowly added to the flask. The ice bath was replaced by a heating mantle and the reaction mixture stirred and heated at reflux for about 6½ hours. The reaction mixture was filtered and the solids washed three times with benzene. The benzene washings were combined with the filtrate, dried over magnesium sulfate, filtered and distilled under reduced pressure to remove the benzene and to yield a yellow liquid residue. This residue was distilled in vacuo to yield N-methyl-2-methylphenoxyacetamide as a clear, colorless liquid boiling 111–4° C. at 0.25 mm. Hg pressure. A sample of this material boiling 111–2° at 0.25 mm. Hg pressure had the following elemental analysis as calculated for $C_{10}H_{13}NO_2$:

Theoretical (percent): C, 67.04; H, 7.26; N, 7.82.
Found (percent): C, 66.87; H, 7.62; N, 7.92.

EXAMPLE 3

Preparation of 2-methylphenoxyacetyl chloride 2-methylphenoxyacetic acid (161.9 g.; 0.975 mol) and touluene (400 ml.) were placed in a 1 liter three-necked round bottom flask fitted with a mechanical stirrer, reflux condenser topped with a calcium chloride drying tube, and a dropping funnel. The contents of the flask were stirred and thionyl chloride (77.9 ml.; 1.74 mol) was slowly added to the flask. The contents were heated to reflux and stirring was continued at reflux for about 7 hours. The reaction mixture was boiled with ground charcoal and filtered while hot. The filtrate was dried over magnesium sulfate, filtered and distilled under reduced pressure to remove benzene and excess thionyl chloride. The residue was distilled in vacuo to yield the product 2-methylphenoxyacetyl chloride as a clear, yellow liquid boiling 120–2° C./16 mm. Hg pressure.

EXAMPLE 4

Preparation of N,N-diethyl-2-methyl-phenoxyacetamide

Diethylamine (5.6 g.; 0.76 mol) in benzene (75 ml.) and potassium carbonate (10.5 g.; 0.076 mol) are placed into a 300 ml. three-necked round bottom flask fitted with a mechanical stirrer, reflux condenser and addition funnel. This mixture was cooled in an ice bath and water (7.5 ml.) was added to the flask. The mixture was stirred and 2-methylphenoxyacetyl chloride (14 g.; 0.076 mol) was slowly added to the flask. The ice bath was replaced by a heating mantle and the reaction mixture stirred and heated at reflux for about 6½ hours. The reaction mixture was filtered and the solids washed three times with benzene. The benzene washings were combined with the filtrate, the aqueous layer separated therefrom and the organic layer dried over anhydrous magnesium sulfate, filtered and distilled under reduced pressure to remove the benzene and to yield a yellow liquid residue. This residue was distilled in vacuo to yield N,N-diethyl-2-methylphenoxyacetamide as a clear, colorless liquid boiling 112.5–16° C. at 0.25 mm. Hg pressure. A sample of this material boiling 113° C. at 0.25 mm. Hg pressure had the following elemental analysis as calculated for $C_{13}H_{19}NO_2$:

Theoretical (percent) : C, 70.59; H, 8.6; N, 6.33.
Found (percent): C, 70.43; H, 8.82; N, 6.37.

EXAMPLE 5

Preparation of N-methyl-N-n-propyl-2-methylphenoxyacetamide

N-methyl-N-n-propylamine (5.0 g.; 0.068 mol), potassium carbonate (5.1 g.; 0.037 mol), benzene (70 ml.) and water (7.0 ml.) were placed in the flask described in Example 1. The mixture was stirred and 2-methylphenoxyacetyl chloride (12.6 g.; 0.068 mol) was slowly added to the flask. The reaction mixture was stirred and heated at reflux for 7 hours. The reaction mixture was filtered and the solid washed three times with benzene. The washings and filtrate were combined, the aqueous layer separated therefrom and the organic layer dried over magnesium sulfate and filtered. The filtrate was distilled under reduced pressure to remove benzene and to yield a yellow liquid which was distilled in vacuo. N-methyl-N-n-propyl-2-methylphenoxyacetamide was recovered as a clear, colorless distillate boiling 119–31° C. at 0.05 mm. Hg pressure. A sample boiling 121–6° C. at 0.05 mm. Hg pressure had the following elemental analysis as calculated for $C_{13}H_{19}NO_2$:

Theoretical (percent): C, 70.59; H, 8.6; N, 6.33.
Found (percent): C, 70.54; H, 9.09; N, 6.36.

EXAMPLE 6

Preparation of N-allyl-2-methylphenoxyacetamide

Allylamine (4.3 g.; 0.076 mol), potassium carbonate (10.5 g.; 0.076 mol), benzene (75 ml.) and water (7.5 ml.) were placed in the flask described in Example 1. The mixture was stirred and 2-methylphenoxyacetyl chloride (14 g.; 0.076 mol) was slowly added to the flask. The reaction mixture was stirred and heated to reflux for about 6½ hours. The reaction mixture was treated as described in the previous examples to yield at clear, yellow liquid which was distilled in vacuo to yield N-allyl-2-methylphenoxyacetamide as a clear, colorless distillate boiling 115–8° C. at 0.25–0.27 mm. Hg pressure. A sample boiling 115–6° C. at 0.25 mm. Hg pressure had the following elemental analysis as calculated for

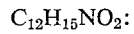

$C_{12}H_{15}NO_2$:

Theoretical (percent): C, 70.24; H, 7.32; N, 6.83.
Found (percent): C, 70.60; H, 7.79; N, 6.86.

EXAMPLE 7

Preparation of N-carboxymethyl-2-methyl-phenoxyacetamide

Glycine (5.0 g.; 0.067 mol) and an aqueous solution (101 ml.) of sodium hydroxide (5.4 g.; 0.134 mol) were placed in the apparatus described in the previous examples. The mixture was stirred and cooled in an ice bath. 2-methylphenoxyacetyl chloride (12.4 g.; 0.067 mol) was slowly added. The ice bath was removed and the reaction mixture stirred and warmed to room temperature over a period of ½ hour. Several ml. of water were added to the flask to dissolve solids which had precipitated out of solution. The reaction mixture was filtered and the filtrate acidified in concentrated hydrochloric acid. The suspension which formed was filtered and the residue washed twice with water and dried under vacuum. The white solid residue was recrystallized from a mixture of dimethyl sulfoxide and water, washed with water and dried in vacuo to yield N-carboxymethyl - 2 - methyl-phenoxy-acetamide as a solid melting 189–90° C. with decomposition and having the following elemental analysis as calculated for $C_{11}H_{13}NO_4$:

Theoretical (percent): C, 59.18; H, 5.88; N, 6.28.
Found (percent): C, 59.29; H, 6.60; N, 6.35.

EXAMPLE 8

Preparation of N-β-chloroethyl-2-methylphenoxyacetamide

Ethylenimine (2.8 g.; 0.066 mol) in methylene chloride (60 ml.) was placed in a 300 ml. three-necked round bottom flask fitted as heretofore described. The solution was cooled to −5° C. by an ice water-salt bath and a solution of 2-methylphenoxyacetyl chloride (12.2 g.; 0.066 mol) in methylene chloride (10 ml.) was slowly added. After the addition was complete the cooling bath was removed and the reaction mixture stirred for one hour as it warmed to room temperature. The reaction mixture was dried over magnesium sulfate, filtered and distilled in vacuo to yield a light yellow liquid which solidified on standing. The solid was recrystallized from benzenepentane, washed with pentane and dried in vacuo to yield N-β-chloroethyl-2-methylphenoxyacetamide as a solid melting 76–7° C. and having the following elemental analysis as calculated for $C_{11}H_{14}ClNO_2$:

Theoretical (percent): C, 58.02; H, 6.15; Cl, 15.60; N, 6.15. Found (percent): C, 57.90; H, 6.64; Cl, 15.77; N, 6.21.

EXAMPLE 9

Preparation of N-hydroxymethyl-2-methyl-phenoxyacetamide

A suspension of 2-methylphenoxyacetamide (12.2 g.; 0.074 mol) in 5% aqueous potassium carbonate (11 ml.; 0.004 mol) and 36% aqueous formaldehyde (11 ml.; 0.132 mol) was heated on a steam bath until a clear solution was obtained. The solution was cooled and a white solid precipitated. The reaction mixture was filtered and the solid washed with 5% aqueous sodium hydroxide and water and dried in vacuo. The white solid was recrystallized twice from toluene-pentane, washed with pentane and dried in vacuo to yield N-hydroxymethyl-2-methylphenoxyacetamide as a white solid melting 115–6° C. and having the following elemental analysis as calculated for $C_{10}H_{13}NO_3$:

Theoretical (percent): C, 61.54; H, 6.67; N, 7.18. Found (percent): C, 61.51; H, 7.07; N, 7.24.

The other compounds of the present invention can be prepared readily by the procedure detailed above. Given in the following examples are the amine reactants which can be used to prepare the named compound in Table I, and the physical properties of the compounds obtained in Table II. In the tables 2-methylphenoxyacetamide is denoted as 2-MPAM, boiling point as b., millimeters mercury pressure as mm., and melting point as m., for the sake of brevity.

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems

TABLE I

| Example | Amine Reactant | Compound |
|---|---|---|
| 10 | N,N-dimethylamine | N,N-dimethyl-2-MPAM. |
| 11 | Ethylamine | N-ethyl-2-MPAM. |
| 12 | n-Propylamine | N,n-propyl-2-MPAM. |
| 13 | N,N-di-n-propylamine | N,N-di-n-propyl-2-MPAM. |
| 12 | n-Propylamine | N,n-propyl-2-MPAM. |
| 14 | Isopropylamine | N-isopropyl-2-MPAM. |
| 15 | N,N-diallylamine | N,N-diallyl-2-MPAM. |
| 16 | N,N-diisopropylamine | N,N-diisopropyl-2-MPAM. |
| 17 | N-methyl-N-isopropylamine | N-methyl-N-isopropyl-2-MPAM. |
| 18 | N-ethyl-N-isopropylamine | N-ethyl-N-isopropyl-2-MPAM. |
| 19 | Aminoacetonitrile | N-cyanomethyl-2-MPAM. |
| 20 | β-Methoxyethylamine | N-β-methoxyethyl-2-MPAM. |
| 21 | β-Methoxyisopropylamine | N-β-methoxyisopropyl-2-MPAM. |
| 22 | Propargylamine | N-propargyl-2-MPAM. |
| 23 | Dipropargylamine | N,N-dipropargyl-2-MPAM. |
| 24 | Octylamine | N-octyl-2-MPAM. |
| 25 | Dodecylamine | N-dodecyl-2-MPAM. |
| 26 | Undecenylamine | N-undecenyl-2-MPAM. |
| 27 | 3-n-butylaminobut-1-yne | N-butyl-N-1-methylprop-2-ynyl-2'-MPAM. |
| 28 | Chloropropylamine | N-chloropropyl-2-MPAM. |
| 29 | Chloroallylamine | N-chlorallyl-2-MPAM. |
| 30 | 3-butoxypropylamine | N-3-butoxypropyl-2'-MPAM. |
| 31 | 11-aminoundecanenitrile | N-11-cyanoundecyl-2'-MPAM. |
| 32 | N-allyl-6-methoxyhexyl-amine | N-allyl-N-6-methoxyhexyl-2'-MPAM. |
| 33 | Aminobutyric acid | N-carboxybutyl-2-MPAM. |
| 34 | 3-chloro-2-methylbutylamine | N-3-chloro-2-methylbutyl-2'-MPAM. |

[TABLE II]

| Example | Physical property | Calculated for | C Theory | C Found | H Theory | H Found | N Theory | N Found |
|---|---|---|---|---|---|---|---|---|
| 10 | b. 109–13° C./0.2 mm | $C_{11}H_{15}NO_2$ | 68.39 | 68.36 | 7.77 | 8.09 | 7.25 | 7.28 |
| 11 | m. 70–2° C | $C_{11}H_{15}NO_2$ | 68.39 | 68.13 | 7.77 | 8.00 | 7.25 | 7.23 |
| 12 | b. 114–6° C./0.26 mm | $C_{12}H_{17}NO_2$ | 69.57 | 69.81 | 8.21 | 8.41 | 6.76 | 6.72 |
| 13 | b. 124–8° C./0.25 mm | $C_{15}H_{23}NO_2$ | 72.29 | 72.36 | 9.24 | 9.71 | 5.62 | 5.65 |
| 14 | m. 63–7° C | $C_{12}H_{17}NO_2$ | 69.57 | 68.99 | 8.21 | 8.33 | 6.76 | 7.02 |
| 15 | b. 128–30°C./0.30 mm | $C_{15}H_{18}NO_2$ | 73.47 | 73.46 | 7.76 | 8.33 | 5.71 | 5.67 |
| 16 | m. 58–9° C | $C_{15}H_{23}NO_2$ | 72.29 | 72.16 | 9.24 | 9.54 | 5.62 | 5.70 |
| 17 | b. 118–23° C./0.05 mm | $C_{13}H_{19}NO_2$ | 70.59 | 69.87 | 8.60 | 8.99 | 6.33 | 6.09 |
| 18 | b. 118–22° C./0.03 mm | $C_{14}H_{21}NO_2$ | 71.49 | 70.78 | 8.94 | 9.24 | 5.96 | 6.03 |
| 19 | m. 103–4° C | $C_{11}H_{12}N_2O_2$ | 64.71 | 64.47 | 5.88 | 6.07 | 13.73 | 13.75 |
| 20 | b. 128–35° C./0.05 mm | $C_{12}H_{17}NO_3$ | 64.57 | 64.38 | 7.62 | 7.81 | 6.28 | 6.34 |
| 21 | b. 125–31° C.–/0.03 mm | $C_{13}H_{19}NO_3$ | 65.82 | 65.47 | 8.02 | 8.32 | 5.91 | 5.88 | an inverted emulsion (water in-oil) can be prepared for direct application to weed infestations.

A typical herbicidal composition according to this invention is illustrated by the following example, in which the quantities are in parts by weight.

EXAMPLE 35

Preparation of a dust

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, desiccants, growth inhibitors, and the like, in the herbicidal compositions heretofore described. These other materials can comprise from about 5% to about 95% of the active ingredients in the herbicidal compositions. Use of combinations of these other herbicides and/or defoliants, desiccants, etc. with the compounds of the present invention provide herbicidal compositions which are more effective in controlling weeds and often provide results unattainable with separate compositions of the individual herbicides. The other herbicides, defoliants, desiccants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), and the like; carbamate herbicides such as IPC, CIPC, swep, barban, and the like; thiocarbamate, and dithiocarbamate herbicides such as CDEC, methan sodium, EPTC, diallate, PEBC, and the like; substituted urea herbicides such as dichloral urea, fenuron, monuron, diuron, linuron, neburon, and the like; symmetrical triazine herbicides such as simazine, chlorazine, atrazine, trietazine, simetone, prometone, propazine, ametryne, and the like; chloroacetamide herbicides such as alpha-chloro-N,N-dimethylacetamide, CDEA, alpha-chloro-N-isopropylacetamide, 4 - (chloroacetyl)-morpholine, 1 - (chloroacetyl) - piperidine, and the like; chlorinated aliphatic acid herbicides such as TCA, dalapon, 2,3-dichloropropionic acid, and the like, chlorinated benzoic acid and phenylacetic acid herbicides such as 2,3,6-TBA,2,3,5,6-TBA, dicamba, tricamba, amibien, fenac, 2-methoxy-3,6-dichlorophenylacetic acid, 3-methoxy - 2,6 - dichlorophenylacetic acid, 2-methoxy-3,5,6-trichlorophenylacetic acid, and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil; DPA, diphenamid, dipropalin, trifluralin, solan, dicryl, merphos, DMPA and the like. Such herbicides can also be used in the methods and compositions of this invention in the form of their salts, ester, amides, and other derivatives whenever applicable to the particular parent compound.

Weeds are undesirable plants growing where they are not wanted, having no economic value, and interfering with the production of cultivated crops, with the growing of ornamental plants, or with the welfare of livestock. Many types of weeds are known including annuals such as pigweed, lambsquarters, foxtail, crabgrass, wild mustard, field pennycress, ryegrass, goose-grass, chickweed, wild oats, velvet leaf, purselane, barnyard grass, and smartweed; biennials such as wild carrot, great burdock, mullein, round-leaved mallow, blue thistle, bull thistle, houndstongue, moth mullein, and purple star thistle; or perennials such as white cockle, perennial ryegrass, quackgrass, Johnson grass, Canada thistle, Hedge bindweed, Bermuda grass, sheep sorrel, curly dock, nutgrass, field chickweed, and winter-cress. Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The exact amount of compound required will depend on a variety of factors, including the hardness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal activity of the compounds of this invention was demonstrated by experiments carried out for the postemergence control of crabgrass. In these experiments the compounds to be tested were formulated as aqueous emulsions and sprayed at the indicated dosage on the foliage of crabgrass plants that had attained a prescribed size. After spraying the plants were placed in a greenhouse and watered daily or more frequently. Water was not applied to the foliage of the treated plants. The severity of injury to the plants was determined 10 to 15 days after treatment and was rated on the scale of from 0 to 10 as follows: 0=no injury, 1,2=slight injury, 3,4=moderate injury, 5,6=moderately severe injury, 7,8,9=severe injury and 10=death.

The effectiveness of these compounds are demonstrated by the following data:

TABLE I

| Test compound | Concentration of test compound (lb./acre) | Injury rating |
|---|---|---|
| N-methyl-N-n-propyl-2-MPAM | 8 | 8 |
| N,N-di-n-propyl-2-MPAM | 8 | 7 |
| N- n-propyl-2-MPAM | 8 | 8 |
| N-ethyl-2-MPAM | 8 | 7 |
| N,N-di-isopropyl-2-MPAM | 8 | 7 |
| N-carboxymethyl-2-MPAM | 8 | 7 |
| N-β-chloroethyl-2-MPAM | 8 | 8 |

The above experiments were repeated except that pigweed plants were used in place of crabgrass plants. The effectiveness of these compounds is demonstrated by the following data:

TABLE II

| Test compound | Concentration of test compound (lb./acre) | Injury rating |
|---|---|---|
| N-allyl-2-MPAM | 8 | 10 |
| N,N-diallyl-2-MPAM | 8 | 10 |
| N,N-di-n-propyl-2-MPAM | 8 | 10 |
| N-n-propyl-2-MPAM | 8 | 10 |
| N-ethyl-2-MPAM | 8 | 9 |
| N-carboxymethyl-2-MPAM | 8 | 10 |
| N-cyanomethyl-2-MPAM | 8 | 10 |
| N-β-methoxyethyl-2-MPAM | 8 | 9 |
| N-β-methoxyisopropyl-2-MPAM | 8 | 10 |

The above experiments were repeated except that dock plants were used in place of pigweed plants. The effectiveness of these compounds is demonstrated by the following data:

TABLE III

| Test compound | Concentration of test compound (lb./acre) | Injury rating |
|---|---|---|
| N-methyl-N-isopropyl-2-MPAM | 8 | 8 |
| N-allyl-2-MPAM | 8 | 9 |
| N,N-diallyl-2-MPAM | 8 | 7 |
| N,N-di-n-propyl-2-MPAM | 8 | 7 |
| N-n-propyl-2-MPAM | 8 | 9 |
| N-ethyl-N-isopropyl-2-MPAM | 8 | 9 |
| N-β-methoxyisopropyl-2-MPAM | 8 | 8 |

We claim:
1. A compound of the formula

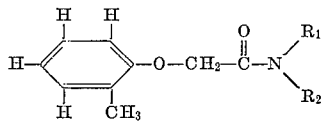

wherein $R_1$ is selected from the group consisting of propargyl, haloalkyl of up to 5 carbon atoms, carboxy alkyl of up to 3 carbon atoms and lower alkoxy alkyl; and $R_2$ is selected from the group consisting of hydrogen, propargyl, haloalkyl of up to 5 carbon atoms, carboxy alkyl of up to 3 carbon atoms and lower alkoxyalkyl.

2. The compound of claim 1 N-allyl-2-methylphenoxyacetamide.

3. The compound of claim 1 N,N-diallyl-2-methylphenoxyacetamide.

4. The compound of claim 1 N-β-methoxy-isopropyl-2-methylphenoxyacetamide.

5. A compound of claim 1, N-carboxymethyl-2-methylphenoxyacetamide.

6. A compound of claim 1, N-β-chloro ethyl 2-methylphenoxyacetamide.

7. A compound of claim 1, N-β-ethoxy ethyl-2-methylphenoxyacetamide.

References Cited

UNITED STATES PATENTS

| 2,927,126 | 1960 | Pursglove | 260—465 |
| 3,326,942 | 6/1967 | Geary | 260—559 |

OTHER REFERENCES

Thompson et al., Botanical Gazette, vol. 107, June 19, 1946, pp. 476–488, 496–507.

Cont., Bottettino Chimico Farmaceutico, vol. 104, February 1965, pp. 89–93.

HENRY R. JILES, Primary Examiner

H. I. MOATZ, Assistant Examiner

U.S. Cl. X.R.

260—465, 517; 71—118, 116, 105